United States Patent [19]

Simpson

[11] 4,396,500
[45] Aug. 2, 1983

[54] HYDROTREATING PROCESS

[75] Inventor: Howard D. Simpson, Irvine, Calif.

[73] Assignee: Union Oil Company of California, Los Angeles, Calif.

[21] Appl. No.: 167,679

[22] Filed: Jul. 11, 1980

Related U.S. Application Data

[62] Division of Ser. No. 38,334, May 11, 1979, Pat. No. 4,255,282.

[51] Int. Cl.³ .............................................. C10G 17/00
[52] U.S. Cl. ............................ 208/216 R; 208/254 H
[58] Field of Search ........................ 208/216 R, 254 H

[56] References Cited

U.S. PATENT DOCUMENTS

| | | | |
|---|---|---|---|
| 2,890,162 | 6/1959 | Anderson et al. | 208/216 |
| 2,905,636 | 9/1959 | Watkins et al. | 208/216 |
| 2,924,568 | 2/1960 | Anderson et al. | 208/216 |
| 3,222,273 | 12/1965 | Flinn et al. | 208/254 H |
| 3,287,280 | 11/1966 | Colgan | 252/435 |
| 3,293,268 | 12/1966 | Bergman et al. | 260/346.8 |
| 3,446,730 | 5/1969 | Kerns et al. | 208/254 |
| 3,706,693 | 12/1972 | Mickelson et al. | 252/435 |
| 3,749,664 | 7/1973 | Mickelson | 208/254 H |
| 3,755,150 | 8/1973 | Mickelson | 208/216 R |
| 3,755,196 | 8/1973 | Mickelson | 252/435 |
| 3,817,873 | 6/1974 | Mickelson | 252/435 |
| 3,830,752 | 8/1974 | Mickelson | 252/435 |
| 3,897,365 | 7/1975 | Feins et al. | 252/435 |
| 3,932,270 | 1/1976 | Johnson | 208/216 |
| 4,016,106 | 4/1977 | Sawyer et al. | 252/455 |
| 4,032,433 | 6/1977 | Petri et al. | 208/216 R |
| 4,048,115 | 9/1977 | O'Hara | 252/465 |
| 4,080,313 | 3/1978 | Whittam | 252/465 |
| 4,081,353 | 3/1978 | Kehl | 208/216 |
| 4,082,695 | 4/1978 | Rosenski et al. | 252/465 |
| 4,088,435 | 5/1978 | Hindin et al. | 252/465 |
| 4,097,413 | 6/1978 | Simpson | 208/216 R |
| 4,122,039 | 10/1978 | Kobylinski et al. | 252/437 |
| 4,170,570 | 10/1979 | Zagata et al. | 252/465 |
| 4,177,163 | 12/1979 | Oleck et al. | 208/254 H |
| 4,213,850 | 7/1980 | Riddick et al. | 208/216 R |

FOREIGN PATENT DOCUMENTS 1511479  5/1978  United Kingdom .

*Primary Examiner*—Charles F. Warren
*Assistant Examiner*—Joseph A. Boska
*Attorney, Agent, or Firm*—Gregory F. Wirzbicki; Dean Sandford

[57] ABSTRACT

A hydrotreating catalyst comprises molybdenum, nickel, and phosphorus components supported on gamma alumina precalcined at a temperature of at least 1375° F.

14 Claims, No Drawings

HYDROTREATING PROCESS

This is a division of application Ser. No. 38,334, filed May 11, 1979, now U.S. Pat. No. 4,255,282, issued Mar. 10, 1981.

BACKGROUND AND SUMMARY OF THE INVENTION

This invention relates to a hydrotreating catalyst and a method for its preparation. More particularly, the invention relates to a hydrotreating catalyst prepared from gamma alumina precalcined at a temperature above 1375° F.

In the refining of liquid hydrocarbons derived from mineral oils and other sources, it is often necessary to subject the liquid hydrocarbon or fraction thereof to hydrotreating. Hydrotreating is a process for reducing the concentration of nitrogen and sulfur components in a hydrocarbon feedstock so that, when the product hydrocarbon is eventually combusted, less $SO_2$ and NO will form, and hence present less of a pollution problem. In addition, it is often desirable to remove nitrogen from such feedstocks in order to protect hydrocracking catalysts and the like which deactivate in the presence of nitrogen.

In general, hydrotreating is accomplished by contacting the feedstock containing nitrogen and/or sulfur with a catalyst in the presence of hydrogen and under conditions, including elevated temperature and pressure, such that the sulfur components are converted to $H_2S$ and the nitrogen components to $NH_3$, both of which are separated from the desulfurized and denitrogenated liquid product.

A typical hydrotreating catalyst comprises particles containing a Group VIII active metal component and a Group VI active metal component supported on a refractory oxide such as alumina. Oftentimes, phosphorus components are also present in the catalyst to improve its activity by increasing its acidity. One catalyst which has been successfully employed on a commercial basis consists essentially of molybdenum, nickel, and phosphorus components supported on gamma alumina. A typical preparation procedure for such a catalyst is as follows: particles of hydrated alumina are firstly formed into a desired size and shape by extruding the hydrated alumina through a die having circular or clover leaf-shaped openings therein and cutting the extruded matter into particles (or extrudates) of 1/16-⅛ inch lengths. After calcining at a temperature of about 1150°-1250° F., the resulting gamma alumina extrudates are in a condition to be contacted with an impregnating solution comprising dissolved salts of molybdenum and nickel in phosphoric acid. The impregnated extrudates (or composites) are then subjected to a final calcination at a temperature around 900° F. to convert the impregnated metals to their oxide forms.

Quite unexpectedly, it has now been found that, if the above procedure is only slightly altered, the resulting catalyst is substantially more active for hydrotreating purposes. More specifically, it has been found that, if the first calcination, usually termed the precalcination, is conducted at a temperature of at least 1375° F., and preferably at 1450°-1600° F., then the final catalyst will have increased activity for removing sulfur and nitrogen components from liquid hydrocarbons under typical hydrotreating conditions.

In one embodiment, the invention comprises a hydrotreating catalyst composition comprising molybdenum, nickel, and phosphorus components supported on gamma alumina prepared by a method including the step of impregnating a support comprising gamma alumina precalcined at a temperature of at least 1375° F. with components of nickel, phosphorus, and molybdenum. In an alternative embodiment, the invention comprises a method for preparing a hydrotreating catalyst wherein particles of gamma alumina precalcined at at least 1375° F. are impregnated with a solution comprising phosphoric acid containing dissolved nickel and molybdenum components, and the resulting composite is calcined at an elevated temperature. In yet another embodiment, the invention comprises an improved hydrotreating process wherein the improvement resides in the use of a catalyst prepared by calcining a composite comprising molybdenum, nickel, and phosphorus components impregnated into gamma alumina precalcined at at least 1375° F. Usual precalcination temperatures herein are above 1400° F.

DETAILED DESCRIPTION OF THE INVENTION

In accordance with this invention, a catalyst suitable for hydrotreating purposes is prepared by contacting gamma alumina particles precalcined at a temperature of at least 1375° F., preferably at least 1450° F., with a suitable impregnating solution or solutions known in the art as useful for incorporating molybdenum, nickel, and phosphorus components with gamma alumina. A preferred impregnating solution consists of an aqueous solution of phosphoric acid, ammonium heptamolybdate, and nickel nitrate. Depending upon the proportion of nickel, molybdenum, and phosphorus desired in the final catalyst, the impregnating solution contains molybdenum in a concentration of 10-30 wt.% as $MoO_3$, nickel in a concentration of 1-10 wt.% as NiO, and phosphorus in a concentration of 1-10 wt.% P. After the gamma alumina particles have been contacted for a sufficient time with the impregnating solution to insure full impregnation of the desired amount of nickel, molybdenum, and phosphorus, it is dried and subjected to a final calcination, usually at a temperature in the 800°-1000° F. range. The catalyst is then presulfided, either by contact at an elevated temperature with an $H_2$ and $H_2S$-containing gas stream or in situ by allowing the sulfur in the hydrocarbon feedstock to gradually convert the oxide components to the sulfide form. The final catalyst preferably comprises 14-25 wt.% molybdenum components (calculated as $MoO_3$), 2.0-6.0 wt.% nickel components (calculated as NiO), and 2.0-6.0 wt.% phosphorus components (calculated as P). Most preferably, the ratio of nickel components as NiO to molybdenum components as $MoO_2$ is between about 0.18:1 and 0.19:1, and the ratio of phosphorus components as P to nickel components as NiO is about 1:1. Suitable catalysts comprise 12-30 wt.% molybdenum components (calculated as $MoO_3$).

It is a critical feature of the invention herein that the gamma alumina support material be precalcined at at least 1375° F., preferably at at least 1450° F., prior to contact with one or more impregnating solutions. In one embodiment of the invention, the precalcination is carried out by subjecting a hydrated alumina ($Al_2O_3 \cdot xH_2O$) to a temperature in the range of 1375°-1800° F., preferably 1450°-1600° F., for an extended time period, usually ¼-5 hours, preferably ½-2 hours, in the presence of air or other environment consisting of gases (e.g., $N_2$, $CO_2$, Ar), which do not adversely affect the catalyst under high temperature conditions. Alternatively, the same calcination procedure may be applied to any gamma alumina that has never been subjected to temperatures above 1375° F. for a significant length of time. For example, there are many commercially available gamma alumina catalyst supports which, during the manufacture thereof, are calcined in the 800°–1300° F. range, and it is a specific embodiment of the invention that such catalyst supports be calcined again at a temperature above 1375° F., the second calcination being considered herein as the precalcination required prior to contact with an impregnating solution.

Catalysts prepared in accordance with the invention may be used to hydrotreat any hydrocarbon feedstock or fraction thereof containing sulfur and/or nitrogen components. Typical hydrocarbon feedstocks suitable for treatment herein are light and heavy gas oils, cycle oils, naphthas, kerosene, turbine fuels, diesel fuels and syncrudes such as shale oils. The preferred feedstocks are gas oils, in particular gas oils or vacuum gas oils having at least 50% of the components thereof boiling at temperatures less than 700° F., preferably less than 650° F. The typical gas oil to be treated by contact with the catalyst described herein contains at least 2 ppmw of nitrogen components (calculated as nitrogen), usually 10–5000 ppmw of nitrogen components, and at least 0.02% by weight of sulfur components (calculated as sulfur), usually 1.0–3.0% by weight.

Hydrotreating with the catalysts herein is accomplished under conditions known in the art for denitrogenating and/or desulfurizing hydrocarbon feedstocks in the presence of hydrogen. In the usual instance, the feedstock is passed at an elevated temperature and pressure through a catalytic reactor containing a stationary bed of catalyst. Hydrogen is also passed through the reactor with the feedstock, and the hydrogen not consumed in converting the sulfur components to $H_2S$ and the nitrogen components to $NH_3$ is separated from the denitrogenated and/or desulfurized product oil and recycled to the inlet of the reactor. The conditions employed vary from feedstock to feedstock, but the range of conditions set forth in the following table will be those typically employed:

TABLE I

| Operating Conditions | Suitable | Preferred | Most Preferred |
|---|---|---|---|
| Temperature, °F. | 400–1000 | 600–850 | 650–800 |
| Pressure, PSIG | 100–5000 | 400–3000 | 500–2000 |
| Space Velocity, LHSV | 0.1–15 | 1–10 | 2–7 |
| Hydrogen Recycle Rate, cf/bbl[1] | 400–20000 | 1000–15000 | 4000–10000 |

[1]Measured at 60° F. and 1 atmosphere

Although the conditions chosen for any given feedstock will depend in large measure upon the quality of the product desired and the concentrations of sulfur and nitrogen in the feedstock, conditions are usually selected to remove a substantial proportion of both nitrogen and sulfur components, usually at least 50% of each and preferably at least 80% of the sulfur components and 90% of the nitrogen components. Most preferably, conditions are chosen to reduce the nitrogen compounds concentration to less than 10 ppmw (as N) and the sulfur compounds concentration to less than 200 ppmw (as S).

The following comparative example is provided to illustrative the invention; it is not intended to be limiting.

COMPARATIVE EXAMPLE

Several catalysts were prepared and tested under typical hydrotreating conditions against a reference catalyst consisting of particles of a commercially available catalyst sold under the designation HCF by the American Cyanamid Company. The HCF catalyst had a colver leaf cross-sectional shape and was of nominal composition: 18 wt.% $MoO_3$, 2.9 wt.% NiO, 3.2 wt.% P, and the balance gamma alumina. The five catalysts compared against the performance of this commercial catalysts were prepared as follows:

Catalyst No. 1

To 30 g of ammonium heptamolybdate $((NH_4)_6Mo_7O_{24}.4H_2O)$ were slowly added 7 ml of 85% phosphoric acid $(H_3PO_4)$ in the presence of sufficient water that the resulting liquid volume was about 50 ml. The ammonium heptamolybdate was allowed to fully dissolve in the liquid, and then 17 g of nickel nitrate $(Ni(NO_3)_2.6H_2O)$ was added to the solution and dissolved. The resulting deeply green impregnating solution had a total volume of 73 ml.

One hundred grams of hydrated alumina extrudates having a size and shape essentially identical to that of the HCF catalyst particles were precalcined for ½ hour at 1250° F. and then contacted with the impregnating solution by pouring the solution into a beaker containing the precalcined gamma alumina particles. After brief stirring to fully saturate the pores, the alumina particles were aged for about 1 hour, oven dried overnight at 110° C., and calcined in flowing air at 900° F. for about one-half hour. Catalyst No. 1 had the following composition: 18.0 wt.% $MoO_3$, 3.3 wt.% NiO, 2.6 wt.% P, gamma alumina the balance.

Catalyst Nos. 2 and 3

Catalyst Nos. 2 and 3 were prepared in a manner identical to No. 1 except that the precalcination temperature was 1500° F. rather than 1250° F. Catalysts No. 2 and 3 had the same composition as Catalyst No. 1.

Catalyst No. 4

Catalyst No. 4 was prepared in a manner identical to that of Catalysts Nos. 2 and 3 except that impregnation was accomplished as follows: 100 ml of impregnating solution of the same composition as that described above for Catalysts Nos. 1–3 was prepared. It was heated to 40° C. and contacted with the alumina particles for 1 minute, after which time the excess liquid was separated on a Buchner funnel. The catalyst was aged less than 1 hour, and then oven dried and calcined as Catalyst Nos. 1 through 3. Catalyst No. 4 had the following composition: 19.4 wt.% $MoO_3$, 3.5 wt.% NiO, 3.8% P, gamma alumina the remainder.

Catalyst No. 5

This catalyst was prepared identically to Catalyst No. 4 except that the impregnating solution consisted of 62 ml of the impregnating composition used in preparing Catalyst No. 4 plus sufficient added water to produce a total solution of 100 ml. Catalyst No. 5 had a composition as follows: 15.1 wt.% $MoO_3$, 2.7 wt.% NiO, 3.0 wt.% P, gamma alumina the remainer.

Catalysts Nos. 1–5 and the HCF catalyst were then each presulfided by contact with a gas stream consisting of 10 vol.% H hd 2S and 90 vol.% H$_2$. The temperature during the presulfiding was initially at room temperature and then was gradually increased hourly by 50° C. until 700° F. was reached. The 700° F. temperature was held for two hours.

Catalysts Nos. 1–5 were then each tested to determine their individual activities for hydrodenitrogenation and hydrodesulfurization in comparison to the reference HCF catalyst. The catalysts were each charged to a reactor and twice (once at 700° F. and again at 720° F.) utilized to hydrotreat a gas oil feedstock having the characteristics shown in Table I under the following conditions: 1400 psig total pressure, 4.0 LHSV, and hydrogen rate of 6000 CFH/bbl (measured at 60° F. and 1 atmosphere). Giving the reference HCF catalyst an arbitrary activity of 100, the relative activities of Catalyst Nos. 1 through 5 compared to the HCF catalyst were determined by calculation and tabulated in Table II. These determinations were based on a comparison of the reaction rates for denitrogenation and desulfurization obtained from the data of the experiment according to the following standard equations which assume first order kinetics for denitrogenation and one and a half order kinetics for desulfurization:

$$\text{Relative Denitrogenation Activity} = \frac{\text{Log}(N_f/N_p)}{\text{Log}(N_{fr}/N_{pr})} \times 100$$

where $N_{fr}$ and $N_{pr}$ are the respective concentrations of nitrogen in the feed and product obtained with the reference catalyst and $N_f$ and $N_P$ are the respective concentrations of nitrogen in the feed and product obtained with a catalyst being compared to the reference, and $$\text{Relative Desulfurization Activity} = \frac{[(1/S_p)^{\frac{1}{2}} - (1/S_f)^{\frac{1}{2}}]}{[(1/S_{Spr})^{\frac{1}{2}} - (1/S_{fr})^{\frac{1}{2}}]} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

TABLE II

FEEDSTOCK CHARACTERISTICS

| Boiling Range, °F. | | | |
|---|---|---|---|
| IBP/5 | 250/460 | Gravity, D287, °API | 24.6 |
| 10/20 | 512/545 | Sulfur, wt. % | 1.33 |
| 30/40 | 577/600 | Nitrogen: | |
| 50/60 | 626/664 | Basic, wt. % | 0.0738 |
| 70/80 | 691/725 | Total, wt. % | 0.1810 |
| 90/95 | 767/804 | Pour Point, D-97, °F. | .443 |
| EP/Rec., Vol. % | 833/99.3 | Carbon Residue on 10% Botts, D-524, wt. % | 0.32 |

TABLE III

| Catalyst | Compos. wt. % | | | Precalcination Temperature, °F. | Relative Activities | | | | | |
|---|---|---|---|---|---|---|---|---|---|---|
| | MoO$_3$ | NiO | P | | Basic Nitrogen | | Total Nitrogen | | Sulfur | |
| | | | | | 700° F. | 720° F. | 700° F. | 720° F. | 700° F. | 720° F. |
| Ref | 18 | 2.9 | 3.2 | 1200° F.* | 100 | 100 | 100 | 100 | 100 | 100 |
| No. 1 | 18 | 3.3 | 2.6 | 1250 | 102 | 112 | 104 | 106 | 100 | 88 |
| No. 2 | 18 | 3.3 | 2.6 | 1500 | 119 | 125 | 113 | 114 | 117 | 121 |
| No. 3 | 18 | 3.3 | 2.6 | 1500 | 121 | 126 | 118 | 120 | 118 | 124 |
| No. 4 | 19.4 | 3.5 | 3.3 | 1500 | 120 | 138 | 108 | 118 | 112 | 120 |
| No. 5 | 15.1 | 2.7 | 3.3 | 1500 | 110 | 119 | 105 | 108 | 117 | 114 |

*The support precalcination temperature of 1200° F. is believed to be accurate; 1200° F. is typical precalcination temperature for commercial hydrotreating catalysts.

As shown by the results tabulated in Table II, Catalysts Nos. 2 through 5, all of which were precalcined at 1500° F., evidenced higher activity in every category than both the HCF catalyst believed to have been precalcined at 1200° F. and Catalyst No. 1 which was known to have been precalcined at 1250° F. Even Catalyst No. 5, which had a low MoO$_3$ content, exhibited higher activity than HCF or Catalyst No. 1.

In view of the foregoing, it should be apparent that the invention is capable of many modifications, alterations, and variations. Accordingly, it is intended to embrace all such altertions, modifications, and variations as fall within the spirit and scope of the appended claims.

I claim:

1. In a method for hydrotreating a hydrocarbon feedstock containing one or more components selected from the group consisting of organonitrogen compounds and organosulfur compounds wherein the hydrocarbon feedstock is contacted with a catalyst in the presence of hydrogen under sufficient conditions of elevated temperature and pressure to reduce the total content of organonitrogen compounds plus organosulfur compounds in the feedstock, and wherein said catalyst is prepared by impregnating gamma alumina with a phosphoric acid solution containing dissolved nickel and molybdenum components followed by calcining at an elevated temperature, the improvement wherein prior to impregnation said gamma alumina is precalcined at a temperature of at least 1375° F.

2. The method of claim 1 wherein said catalyst was prepared with gamma alumina particles precalcined at a temperature above 1400° F.

3. The method of claim 2 wherein said catalyst comprises 12–30 wt.% of one or more molybdenum components, calculated as MoO$_3$, 2–6 wt.% of one or more nickel components, calculated as NiO, and 2–6 wt.% of one or more phosphorus components, calculated as P, and the remainder consists essentially of gamma alumina.

4. The method of claim 3 wherein said catalyst was prepared with gamma alumina particles precalcined at a temperature above 1450° F.

5. In a hydrotreating process wherein a hydrocarbon feedstock containing one or more contaminants selected from the group consisting of organosulfur compounds and organonitrogen compounds is contacted with a catalyst in the presence of hydrogen and under conditions of elevated temperature and pressure such that a substantial proportion of said contaminants are removed, the improvement wherein said catalyst comprises molybdenum, nickel, and phosphorus components supported on gamma alumina, said catalyst having been prepared by a method comprising the steps of impregnating a support comprising gamma alumina precalcined at a temperature of at least 1375° F. with components of molybdenum, nickel, and phosphorus, and calcining the resulting composite at an elevated temperature.

6. A hydrotreating process as defined in claim 5 wherein said gamma alumina is precalcined at a temperature of at least 1450° F.

7. A hydrotreating process as defined in claim 5 wherein said gamma alumina is precalcined at a temperature less than 1800° F.

8. A hydrotreating process as defined in claim 5 wherein said gamma alumina is precalcined at a temperature between about 1450° and 1600° F.

9. A hydrotreating process as defined in claim 5, 6, 7, and 8 wherein said catalyst composition comprises 12 to 30 wt.% of one or more molybdenum components, calculated as MoO$_3$, 2 to 6 wt.% of one or more nickel components, calculated as NiO, 2 to 6 wt.% of one or more phosphorus components, calculated as P, and the remainder consisting essentially of gamma alumina.

10. A hydrotreating process comprising contacting a hydrocarbon feedstock containing organoitrogen compounds with a solid, particulate catalyst in the presence of hydrogen and at a temperature between about 600° and 850° F. and at a pressure between about 400 and 3000 psig and at a space velocity between about 1 and 10 LHSV so as to substantially lower the organonitrogen content of said feedstock by conversion to ammonia, said catalyst containing molybdenum, nickel, and phosphorus components supported on gamma alumina in proportions sufficient to be catalytically active for hydrotreating purposes, said catalyst having been prepared by a method comprising the steps of (1) precalcining at a temperature above 1375° F. but less than 1800° F. a substance selected from the group consisting of hydrated alumina and gamma alumina previously calcined at a temperature less than 1375° F., said precalcining being under conditions producing an alumina product consisting essentially of gamma alumina precalcined above 1375° F., (2) impregnating said alumina product with a phosphoric acid solution containing dissolved molybdenum and nickel components, and (3) calcining the resulting composite at a temperature above about 800° F.

11. A hydrotreating process as defined in claim 10 wherein said precalcining in step (1) is carried out at a temperature between 1450° and 1600° F.

12. A hydrotreating process as defined in claim 10 or 11 wherein said catalyst composition comprises 12 to 30 wt.% of one or more molybdenum components, calculated as MoO$_3$, 2 to 6 wt.% of one or more nickel components, calculated as NiO, 2 to 6 wt.% of one or more phosphorus components, calculated as P, and the remainder consisting essentially of gamma alumina.

13. A hydrotreating process as defined in claim 12 wherein said hydrocarbon feedstock also contains organosulfur compounds, which organosulfur compounds are removed in a substantial proportion during said contacting by conversion to hydrogen sulfide.

14. A hydrotreating process comprising contacting a hydrocarbon feedstock containing organonitrogen and organosulfur compounds with a particulate, solid catalyst in the presence of hydrogen and at a temperature between about 650° and 800° F. and at a pressure between about 500 and 2000 psig and at a space velocity between about 2 and 7 LHSV so as to substantially lower the content of organonitrogen and organosulfur compounds in said feedstock by conversion to ammonia and hydrogen sulfide, respectively, said catalyst having been prepared by a method comprising the steps of (1) precalcining at a temperature in the range of 1450° to 1550° F. a substance selected from the group consisting of hydrated alumina and gamma alumina previously calcined at a temperature no greater than 1375° F., (2) impregnating the resulting precalcined gamma alumina with a phosphoric acid solution containing dissolved molybdenum and nickel components, said impregnation being such that the resulting composite contains sufficient molybdenum, nickel, and phosphorus components to produce during the calcination of step (3) a final catalyst containing 12 to 30 wt.% of one or more molybdenum components, calculated as MoO$_3$, 2 to 6 wt.% of one or more nickel components, calculated as NiO, and 2 to 6 wt.% of one or more phosphorus components, calculated as P, and (3) calcining the composite produced in step (2) at a temperature of at least 800° F.

* * * * *